United States Patent [19]

Burns

[11] Patent Number: 5,042,835
[45] Date of Patent: Aug. 27, 1991

[54] ROLL OVER PROTECTION APPARATUS

[75] Inventor: Stephen E. Burns, Plainfield, Ill.

[73] Assignee: J. I. Case Company, Racine, Wis.

[21] Appl. No.: 549,737

[22] Filed: Jul. 9, 1990

[51] Int. Cl.$^5$ .............................................. B60R 21/13
[52] U.S. Cl. ................................... 280/756; 296/35.2; 296/107
[58] Field of Search ................ 280/756; 296/35.2, 107

[56] References Cited

U.S. PATENT DOCUMENTS

| | | | |
|---|---|---|---|
| 3,289,871 | 12/1966 | La Tourneau et al. | 414/635 |
| 3,292,726 | 12/1966 | Jette, Jr. | 280/801 |
| 3,563,401 | 2/1971 | Gandolfo et al. | 414/634 |
| 3,578,377 | 5/1971 | Babbitt, Jr. et al. | 296/102 |
| 3,713,688 | 1/1973 | Monroe | 296/107 |
| 3,733,103 | 5/1973 | Hansen | 296/351 |
| 3,762,761 | 10/1973 | Erickson | 296/107 |
| 3,917,310 | 11/1975 | Mitsuishi | 280/756 |
| 3,934,679 | 1/1976 | Lieptz | 187/1 R |
| 4,148,504 | 4/1979 | Rushing | 280/756 |
| 4,158,460 | 6/1979 | White | 280/756 |
| 4,202,565 | 5/1980 | Mosch | 280/756 |
| 4,362,220 | 12/1982 | Baston | 280/756 |
| 4,666,183 | 5/1987 | Azzarello | 280/756 |
| 4,877,265 | 10/1989 | DeBraal et al. | 280/756 |
| 4,949,991 | 8/1990 | Ludwig | 280/756 |

FOREIGN PATENT DOCUMENTS

| | | | |
|---|---|---|---|
| 1372793 | 4/1964 | France | 280/756 |
| 2541953 | 9/1984 | France | 280/756 |

Primary Examiner—Kenneth R. Rice
Attorney, Agent, or Firm—Dressler, Goldsmith, Shore, Sutker & Milnamow, Ltd.

[57] ABSTRACT

A roll over protection apparatus which can be angularly and pivotably moved into various positions relative to the frame of an implement. The roll over protection apparatus includes a roll bar assembly and a mechanism for adjustably mounting the roll bar assembly to the implement frame. The mounting mechanism anchors the roll bar assembly in a manner permitting adjustment of the roll bar assembly into a position best suited for the particular application of the implement while maintaining protection for the operator. Locking mechanisms are also permitted for releasably securing the roll bar in adjusted positions relative to the implement frame.

23 Claims, 4 Drawing Sheets

ROLL OVER PROTECTION APPARATUS

FIELD OF THE INVENTION

The present invention generally relates to a roll over protection apparatus and, more particularly, to a roll over protection apparatus including a roll bar assembly which is pivotably and angularly movable into different operative positions.

BACKGROUND OF THE INVENTION

Off-highway implements such as large tractors, bull dozers, and the like are commonly used on uneven gradings. To protect the driver of a tractor or other form of off-highway implement in the event that the implement rolls over, most implements are provided with some form of roll over protection system or ROPS. A typical ROPS includes two upright members and a cross-piece or cross member. The upright members are usually secured on opposite sides of the implement to support the cross-piece above an operator station.

Tractors and other off-highway implements are used for a myriad of different operations. The particular use of the implement or the addition of certain attachments thereto can have an impact on the design of the ROPS. Of course, the ROPS design must accommodate the tallest person likely to be operating the implement. On the other hand, it is preferable to have the ROPS as short as possible, within this limitation, to maximize overhead clearance of the vehicle.

As an example, the vertical position of a ROPS cross-piece can interfere with certain operations in which there is low overhead clearance, such as in orchards. Therefore, and to avoid harming trees having low-lying limbs, the ROPS is removed or is made as short as possible. Moreover, the width of the ROPS is a consideration when the unobstructed vertical space for operation is limited and operational interference of the ROPS with low lying tree limbs must be minimized.

In an attempt to adapt the size of the ROPS to the implement without destroying its usefulness, some ROPS have been made with adjustable component parts. On larger implements, however, where construction of the ROPS has been reinforced, adding or subtracting parts can be cumbersome, difficult and inconvenient. Adding and/or subtracting parts, and the manufacturing tolerances associated with such parts, further complicates the ROPS design.

Thus, there is a need and a desire for a roll over protection apparatus which is capable of easy adjustment so as to adapt to different implement uses.

SUMMARY OF THE INVENTION

In view of the above, and in accordance with the present invention, there is provided a roll over protection apparatus which can be angularly and pivotably moved into various positions on the frame of an implement to minimize its interference characteristics and maximize usefulness of the implement in areas having restricted or limited vertical space. The roll over protection apparatus includes a roll bar assembly and a mechanism for adjustably mounting the roll bar assembly to the frame of the implement. The mounting mechanism anchors the roll bar assembly to the frame of the implement in a manner permitting adjustment of the roll bar assembly into a position best suited for the particular application of the implement while maintaining protection for the operator thereof.

The roll bar assembly of the present invention is preferably of tubular construction and is configured in a "T" or a "U" shape. The T-shaped roll bar assembly includes a horizontal cross-piece which is normally supported above the operator station of the implement by an upright support member. The U-shaped roll bar assembly includes a generally horizontal cross-piece which is normally supported above the operator station of the implement by two upright support members having their upper ends interconnected by the cross-piece.

In a preferred form of the invention, the mounting mechanism allows for movement of the roll bar assembly about both vertical and horizontal axes. The adjustable mounting mechanism includes at least one attachment assembly which is secured to the implement frame and defines the generally vertical axis about which the roll bar assembly pivotably moves relative to the implement frame. The adjustable mounting mechanism further defines a generally horizontal axis about which the roll bar assembly angularly tilts or moves relative to the implement frame.

In a preferred form, the attachment assembly secures or anchors a lower section of an upright support member of the roll assembly to the frame of the implement. To effect such ends, the attachment assembly includes an upstruck pivot which is generally colinear with and extends, at least partially, within a lower portion of the upright support member such that the roll bar assembly pivotably moves about the pivot relative to the implement frame.

When used is combination with a T-shaped roll bar assembly, a single attachment assembly is used to anchor the upright support member of the roll bar assembly to the implement frame. When used in combination with a U-shaped roll bar assembly, it is preferable to use a pair of laterally spaced attachment assemblies to adjustably anchor both upright support members to the implement frame. When a U-shaped roll bar assembly is used and the cross-piece thereof is arranged in a fore-and-aft relationship extending generally parallel to the frame, a second pair of laterally spaced attachment assemblies may be arranged in a fore-and-aft relationship relative to the other pair of attachment assemblies. One attachment assembly of each pair of attachment assemblies anchors a respective support leg of the U-shaped roll bar assembly when the cross-piece extends generally parallel to the implement frame.

In the illustrated embodiment, each attachment assembly further includes a releasable locking mechanism for locking the roll bar assembly in different adjustable positions relative to the implement frame. The locking mechanism preferably includes an endwise movable locking pin carried by an upright support member of the roll bar assembly and which cooperates with the upstruck pivot of the attachment assembly in locking the roll bar assembly in different adjustable positions. The locking pin is resiliently biased toward the respective pivot, and the locking mechanism includes a detent apparatus for releasably holding the locking pin in a released position to facilitate movement of the roll bar assembly into different angular positions relative to the implement frame.

From the above, it should be understood that the roll bar assembly can be moved into different positions relative to the implement frame to minimize interference characteristics of the roll bar assembly and maximize overhead clearance for the implement. Normally, the roll bar assembly is arranged with the cross-piece extending laterally across the implement frame above the operator station. Alternatively, however, the roll bar assembly can be rotated about the vertical axis of the mounting mechanism such that the cross-piece extends generally parallel to the implement frame thereby reducing the interference characteristics of the roll bar assembly with low lying tree limbs.

When a U-shaped roll bar assembly is utilized, opposite ends of the roll bar assembly are secured by attachment assemblies proximate to the sides of the implement frame. Accordingly, and depending upon the particular application of the implement, the roll bar assembly can be pivotably rotated about the pivot of either attachment assembly such that the cross-piece will extend parallel to the implement frame and proximate to one or the other side of the implement. The locking mechanism holds the roll bar assembly in place during operation of the implement.

To reduce the vertical height of the roll bar assembly, the upright support member can be tilted angularly about the horizontal axis defined by the attachment assembly thereby angling the roll bar assembly and changing the lateral position of the cross-piece relative to the implement frame. As will be understood, angling the roll bar assembly about a horizontal axis will reduce its vertical height. When a U-shaped roll bar assembly is used on the implement, the lateral position of the roll bar assembly cross-piece can be laterally moved beyond the sides of the implement. The endwise movable pin of the locking mechanism cooperates with a pivot of each attachment assembly in securing the angular position of the roll bar assembly relative to the implement frame.

Numerous other features and advantages of the present invention will become readily apparent from the following detailed description, the accompanying drawings, and the appended claims.

DETAILED DESCRIPTION OF THE PRESENT INVENTION

While the present invention is susceptible to embodiments in various forms, there is shown in the drawings and will hereinafter be described two preferred embodiments of the invention, with the understanding that the present disclosure is to be considered as exemplifications of the invention, which are not intended to limit the invention to the specific embodiments illustrated.

Figure 1:
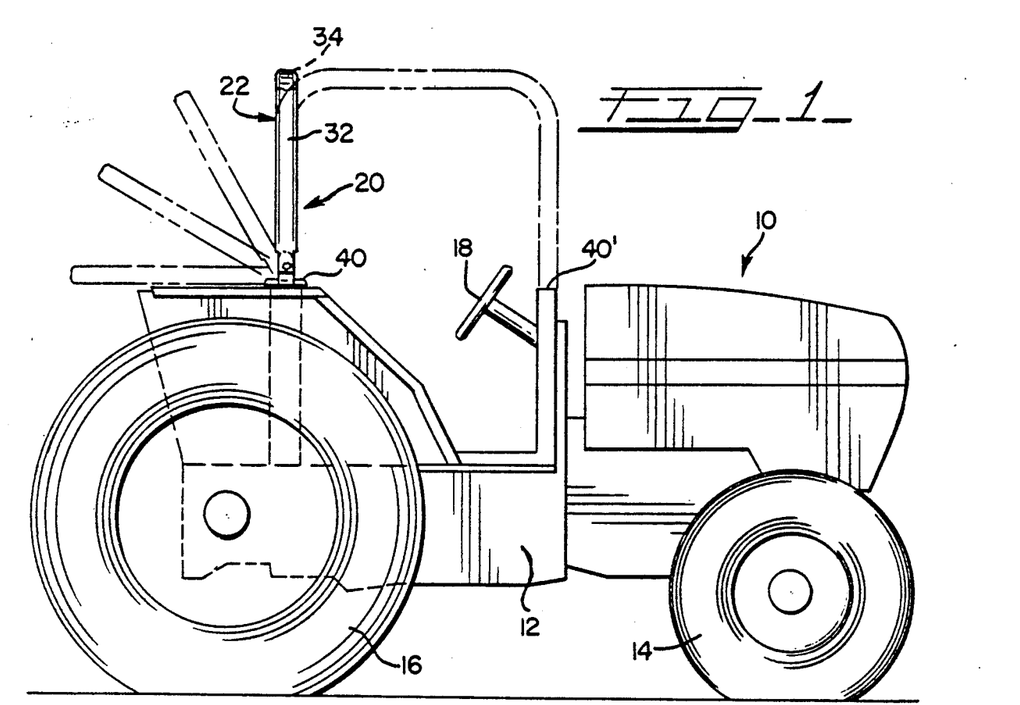
FIG. 1 is a schematic side elevational view of an off-highway implement with a preferred form of the present invention adjustably attached thereto.
Figure 2:
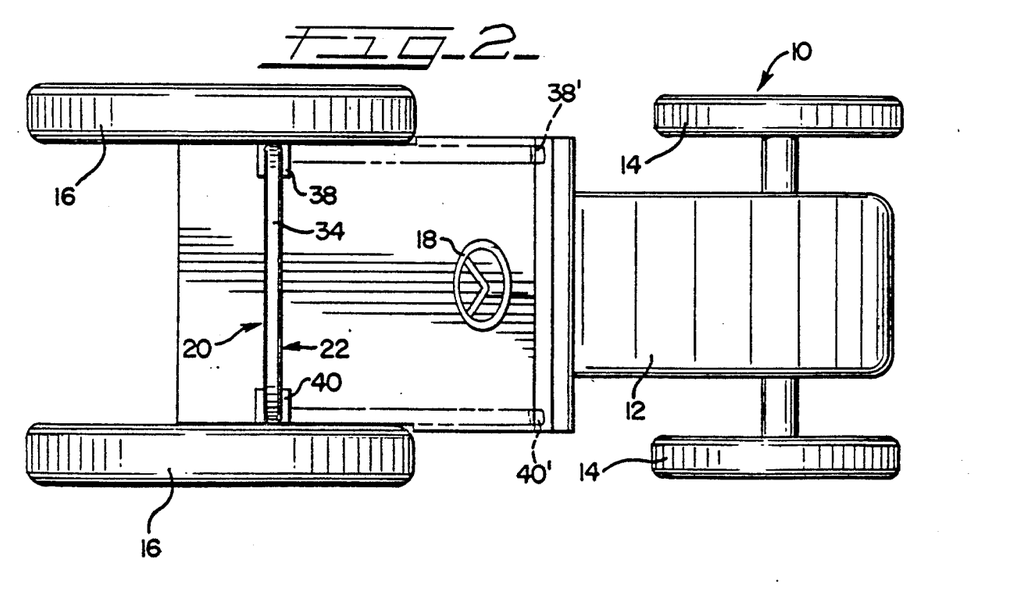
FIG. 2 is a plan view of FIG. 1.

Referring now to the drawings, wherein like reference numerals indicate like parts throughout the several views, in FIGS. 1 and 2 there is schematically illustrated an off-highway implement such as an agricultural tractor 10. Albeit illustrated on a particular implement such as a tractor 10, it should be appreciated that the principles of the present invention relate and equally apply to other types of off-highway implements where there is a need for roll bar protection.

As illustrated in FIGS. 1 and 2, implement 10 has a fore-and-aft extending frame 12 supported for movement by front and rear wheels 14 and 16, respectively. The implement 10 may have various attachments (not shown) releasably connected to a rear end thereof. Between the ends of the frame 12, tractor 10 is provided with an operator station whereat a steering wheel 18, a seat (not shown) and one or more control levers and pedals are located to enable an operator to control, in a known manner, the operations of the tractor.

According to the present invention, an adjustable roll over protection apparatus 20 is mounted to the implement frame 12. The roll over protection apparatus 20 is mounted immediately adjacent the operator station of the implement to provide protection and reduce the possibility of injury to the operator should some event occur that causes the implement to roll over.

The roll over protection apparatus 20 includes a roll bar assembly 22 and mechanism for adjustably mounting the roll bar assembly 22 to the frame of the implement. Albeit secured to the implement frame, and as illustrated in phantom lines in FIGS. 1, 2 and 3, the roll bar assembly 22 can be adjustably moved to assume many different positions relative to the frame of the implement.

In the illustrated embodiment, the roll bar assembly 22 is a tubular structure preferably having a rectangular cross sectional configuration. The size, wall thickness, and overall strength of the tubular structure comprising the roll bar assembly 22 will vary depending upon the particular implement with which the present invention finds utility. As will be appreciated, lighter weight tractors will not require the same strength for the roll bar assembly as may a bull dozer or other construction type equipment of larger size and weight.

Figure 3:
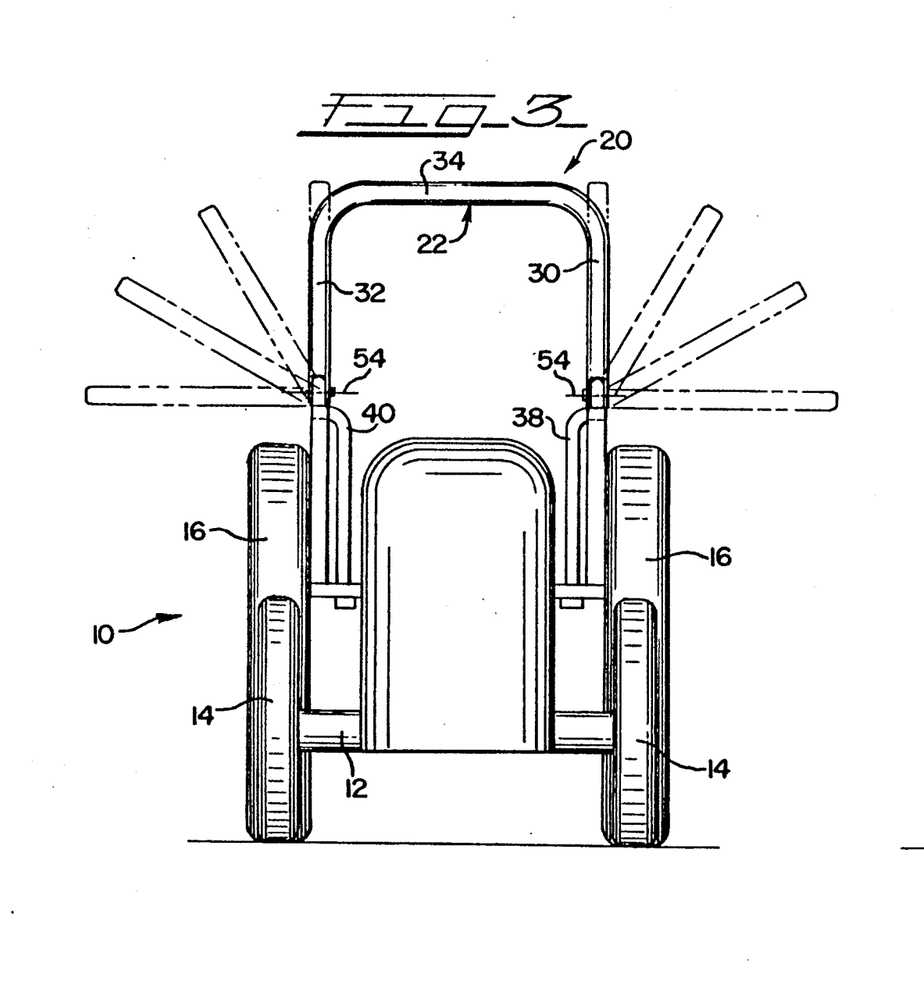
FIG. 3 is a front-end elevational view of FIG. 1.

In a first embodiment, the roll bar assembly 22 has a generally U-shaped configuration. As schematically illustrated in FIG. 3, the roll bar assembly 22 includes two spaced and generally upright support members 30 and 32 whose upper ends are joined by a generally horizontal cross-piece 34. The length of the upright support members 30 and 32 is selected to normally support the cross-piece 34 a predetermined distance above the operator station while at the same time being short enough to maximize the overhead clearance of the implement.

When used in combination with a U-shaped roll bar assembly, the mechanism for adjustably mounting the roll bar assembly 22 to the implement frame 12 preferably includes a pair of laterally spaced attachment assemblies 38 and 40. As will be understood, the attachment assemblies are laterally spaced apart a distance equal to the distance separating the upright support members 30 and 32 of the roll bar assembly. For purposes to be described in detail hereinafter, a second pair of spaced attachment assemblies 38' and 40' (FIG. 2) are arranged in a fore-and-aft relationship relative to attachment assemblies 38 and 40.

Figure 4:
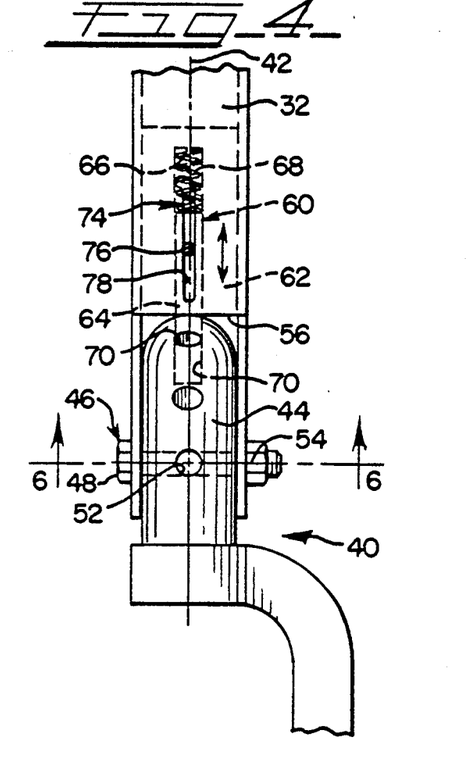
FIG. 4 is an enlarged fragmentary schematic elevational view of an attachment assembly for adjustably attaching the present invention to a frame of the off-highway implement.
Figure 5:
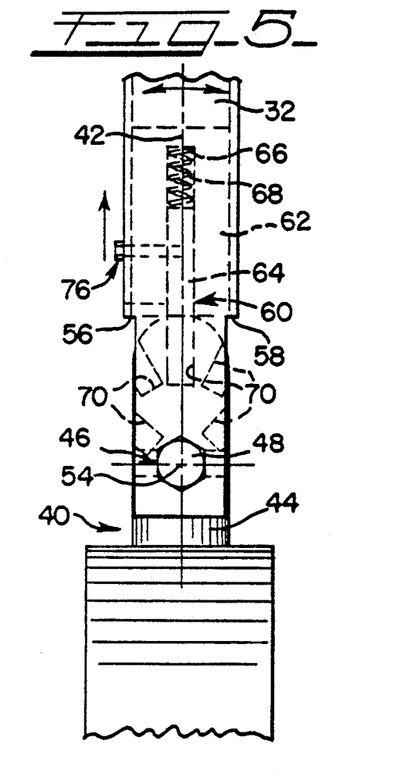
FIG. 5 is a side elevational view of the attachment assembly illustrated in FIG. 4.

The attachment assemblies of each pair of attachment assemblies are substantially similar to each other and, therefore, only attachment assembly 40 will be discussed in detail. Each attachment assembly is secured to the implement frame and, as illustrated in FIGS. 4 and 5, defines a generally upright or vertical axis 42. As illustrated, each attachment assembly secures a lower section of respective upper support member of the roll bar assembly 22 of the implement frame for pivotable movement. In the preferred embodiment, each attachment assembly includes an upright generally cylindrical pivot 44 defining the generally vertical axis 42. As illustrated, the pivot 44 is colinear with and extends, at least partially, within a lower portion of a respective support member of the roll bar assembly 22.

Figure 6:
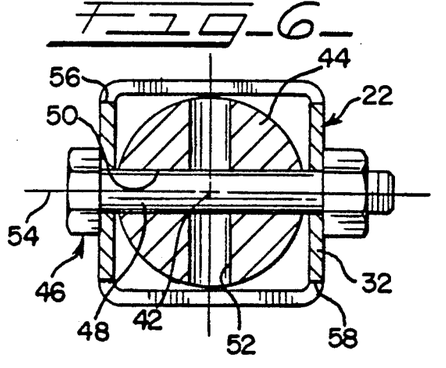
FIG. 6 is a sectional view taken along line 6—6 of FIG. 4.

As schematically illustrated in FIGS. 4, 5 and 6, the outside diameter of the upstruck pivot 44 is equal to or slightly less than the inside dimension between opposed walls of a respective support member of the roll bar assembly 22. At its upper end, the pivot 44 has a generally semi-spherical configuration which facilitates angular tilting of the roll bar assembly 22 relative to the implement frame.

Each attachment assembly further includes a locking mechanism for interconnecting the roll bar assembly and the implement frame 12 and for inhibiting pivotal movement of the roll bar assembly 22 about the generally vertical axis 42 of a respective attachment assembly. In the embodiment illustrated in FIG. 6, locking mechanism 46 includes an elongated bolt 48 or other suitable pin-like device which passes through opposite walls of the upright support member of the roll bar assembly and through an elongated bore 50 defined by pivot 44. A second bore 52 extending generally normal to the bore 50 is further defined by the upright pivot 44 for accommodating the bolt 48 after the roll bar assembly has been pivotably rotated about 90° about vertical axis 42.

The longitudinal axis of the locking mechanism 46 defines a horizontal axis 54 about which the respective support member angularly rotates to allow the roll bar assembly to be angularly tilted relative to the implement frame. As illustrated in FIGS. 4, 5 and 6, suitable cut-outs 56, 58 are defined by a lower section of two opposed walls of a respective upright support member of the roll bar assembly to facilitate angular tilting of the roll bar assembly 22 in the direction of arrows (FIG. 5) and about the generally horizontal axis 54. As illustrated, each cut-out extends along the length of the respective support member for a distance equal to or greater than the height of the pivot 44.

In the preferred embodiment, each attachment assembly further includes a locking mechanism 60 for securing or locking the roll bar assembly 22 in a desired angular position about the generally horizontal axis 54 and relative to the implement frame. Because each locking mechanism 60 is substantially identical, only one will be discussed in detail with the understanding that the other locking mechanisms may be similarly constructed.

As illustrated in FIGS. 4 and 5, each upright support member of the roll bar assembly includes an insert 62 and an endwise movable pin 64 which cooperates with the respective pivot of the attachment assembly in locking the roll bar assembly in different tilted positions relative to the implement frame.

Insert 62 is fixedly secured between opposed walls of the upright member proximate to an upper surface of the pivot 44. As illustrated, insert 62 defines a centrally located blind bore or aperture 66 which extends parallel to the respective upright member of the roll bar assembly and which slidably accommodates the locking pin 64 for endwise movement. In the illustrated embodiment, a spring 68 is entrapped within the bore 66 for resiliently biasing the locking pin 64 toward the pivot 44.

Arranged at different angular positions about the periphery of the pivot 44 are a series of bores 70 which releasably accommodate the free end of the locking pin 64. As will be appreciated, the diameter of the locking pin 64 will be appropriately sized to the particular application of the roll bar assembly. The cooperative relationship between the locking pin 64 and the respective angular bore 70 in the pivot 44 releasably interconnects or locks the support member and, thereby, the roll bar assembly in an adjustably tilted position relative to the implement frame.

Each locking mechanism 60 may further include a detent mechanism 74 for releasably holding locking pin 64 in a released position thereby facilitating angular movement of the roll bar assembly 22 relative to the implement frame. For purposes of succinctness and clarity, only one detent mechanism will be described in detail with the understanding that other detent mechanisms may be similarly configured.

Each detent mechanism 74 includes a latching pin 76 which is slidably accommodated for movement within an elongated slot 78 defined by one wall of the respective upright support member. In the illustrated embodiment, latching pin 76 extends radially outward from an upper end of the locking pin 64. As illustrated in FIG. 5, the free end of the latching pin 76 extends beyond the wall of the respective support member to facilitate movement of the locking pin 64. The free end of the latching pin 76 extends through and is guided by the elongated slot 78.

Figure 7:
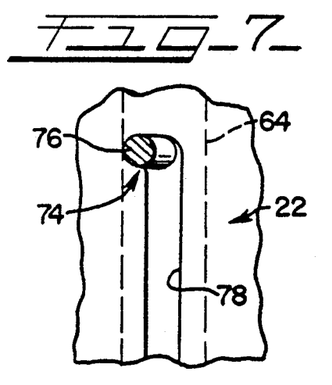
FIG. 7 is an enlarged fragmentary schematic elevational view of a detent mechanism associated with an attachment assembly of the present invention.

Turning now to FIG. 7, the elongated slot 78 has an inverted generally L-shaped configuration. In a preferred embodiment, the longer leg of the L-shape slot 78 extends generally parallel to and limits endwise displacement of the locking pin 64 along the length of a respective support member of the roll bar assembly. The shorter leg section of slot 78 accommodates the latching pin 76 and is positioned to releasably hold locking pin 64 out of engagement with the pivot 44. As will be understood, the resilient action of the spring 68 (FIG. 4) acting against the locking pin 64 facilitates holding the latching pin 76 within the slot 78 in a released position.

Figure 8:
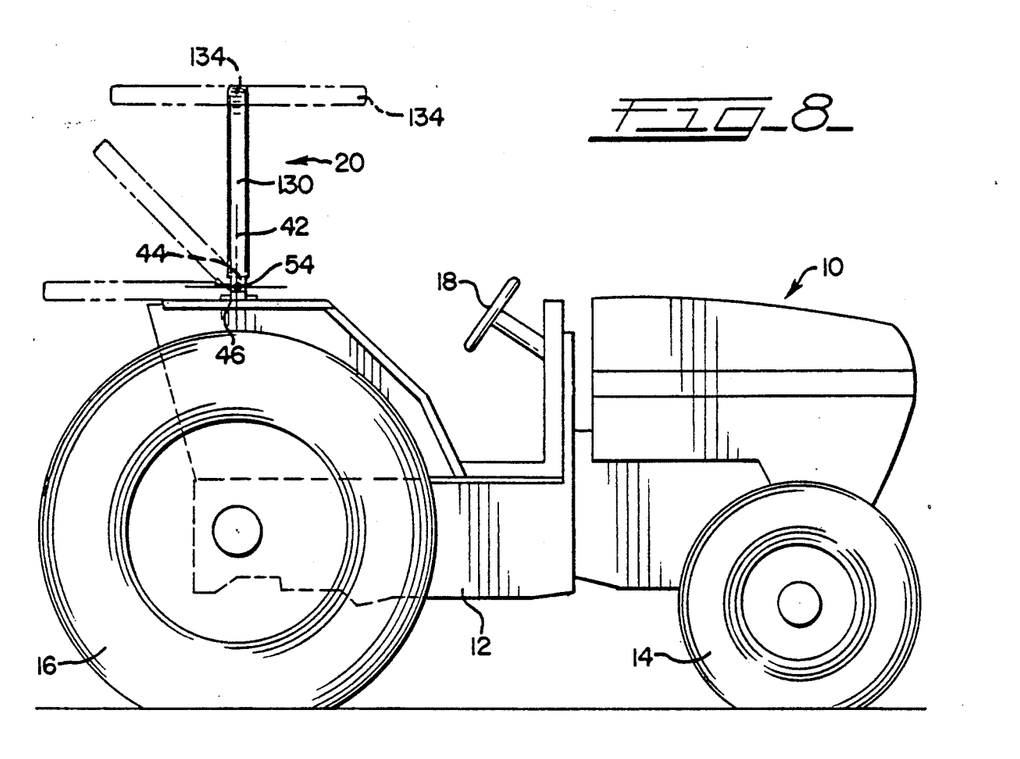
FIG. 8 is a schematic side elevational view of an off-highway implement with a second embodiment of the present invention adjustably attached thereto.
Figure 9:
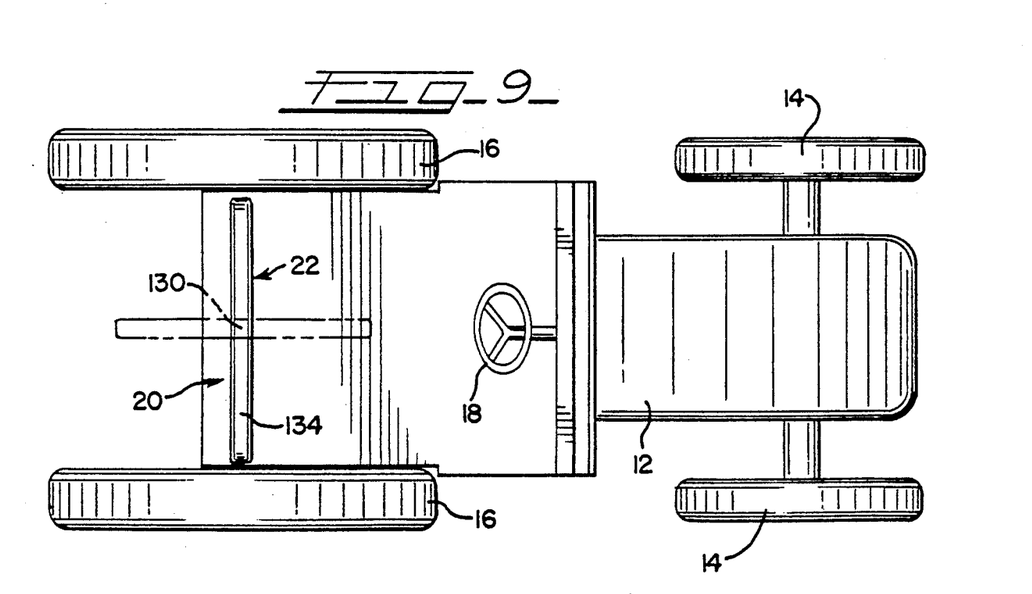
FIG. 9 is a plan view of FIG. 1.
Figure 10:
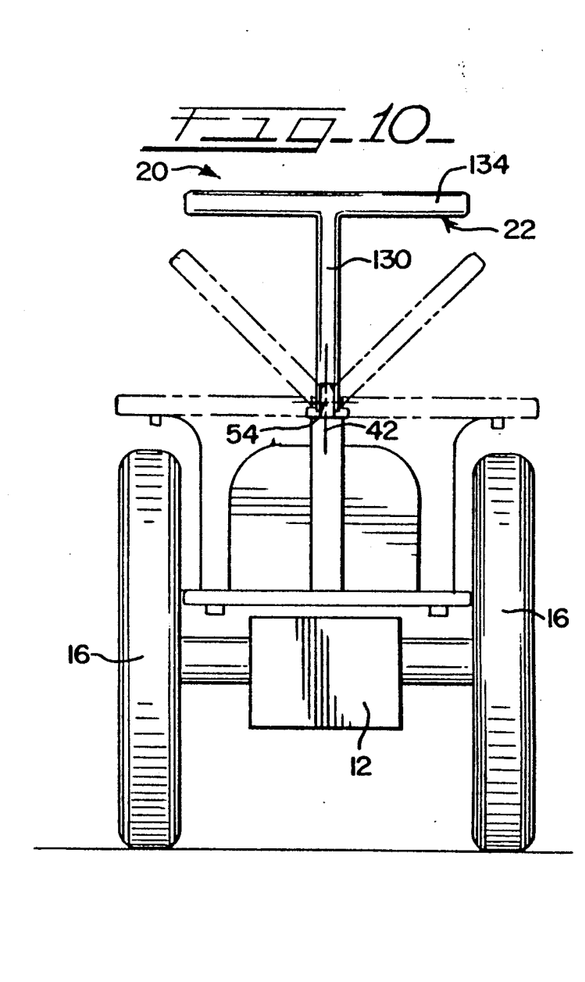
FIG. 10 is a rear end elevational view of FIG. 8.

A second preferred embodiment of the invention is shown in FIGS. 8, 9 and 10, and is substantially identical to the function and construction of the first preferred embodiment hereinabove-described, except for the configuration of the roll bar assembly 22. The structural elements which are common between the first and second embodiments are designated by the same reference numerals in FIGS. 1 through 7 and FIGS. 8 through 10, and the disclosure of the relationship and function of the structural elements as discussed above with regard to FIGS. 1 through 7 are incorporated herein by reference and will not herein be repeated.

The roll bar assembly 22 of the second embodiment is a tubular structure preferably having a rectangular cross sectional configuration. As illustrated in FIGS. 8, 9 and 10, the roll bar assembly 22 of the second embodiment has a generally T-shaped configuration which includes an upright support member 130 with a cross-piece 134 provided toward an upper end thereof and which is supported at a predetermined distance above the operator station of the implement.

In the second embodiment, the mounting mechanism for adjustably mounting the roll bar assembly 22 includes one attachment assembly anchoring the upright support member 130 to the implement frame for pivotal and angular displacement relative thereto. As described in detail above, the attachment assembly includes an upright cylindrical pivot 44 defining the generally vertical axis 42 about which the roll bar assembly 22 of the second embodiment pivotably rotates relative to the frame. The pivot 44 is colinear with and extends, at least partially, within a lower portion of the support member 130.

As with the first embodiment, the attachment assembly for adjustably securing the roll bar assembly 22 of the second embodiment to the implement frame includes a locking mechanism 46 for inhibiting pivotal movement of the support member 130 about the pivot 44. The longitudinal axis of the locking mechanism 46 defines the horizontal axis 54 about which support member 130 angularly moves thereby angularly tilting the roll bar assembly relative to the implement frame.

The attachment assembly for adjustably securing the roll bar assembly of the second embodiment to the implement frame furthermore includes a locking mechanism for locking the support member 130 in an angularly adjusted position relative to the implement frame. Such locking mechanism may be substantially similar to the locking mechanism 60 described above.

During operation, the roll bar assembly 22 of the present invention may be rotationally positioned about the vertical axis defined by an attachment assembly such that the cross-piece thereof extends either laterally across the implement frame 12 or generally parallel in a fore-and-aft relationship relative thereto. Alternatively, the roll bar assembly 22 may be angularly tilted relative to the implement frame to laterally position the cross-piece of the roll bar assembly relative to the operator station to provide operator protection with varying degrees of overhead clearance for the implement.

Regarding the first embodiment of the invention, and as illustrated in solid lines in FIGS. 1, 2 and 3, the roll bar assembly 22 can assume a standard position whereat the cross-piece 34 is positioned a predetermined position above the operator station and generally laterally across the implement frame. As illustrated in phantom lines in FIG. 1, the upright support members 30, 32 of the roll bar assembly 22 can be angularly tilted relative to the frame from a substantially vertical position to a less than vertical position. As will be understood, the clearance above the roll bar assembly increases as a function of the angular tilt of the upright members 30, 32 relative to the implement frame.

Alternatively, and as schematically illustrated in FIG. 2, the roll bar assembly 22 can be rotated or pivoted about a vertical axis defined by either attachment assembly 38 or 40. The ability to pivot the roll bar assembly 22 allows the cross-piece 34 to be readily moved from a position extending generally parallel and in a fore-and-aft relation to the implement frame to a position whereat the cross-piece 34 extends laterally across the implement frame. The ability to position the roll bar assembly to either side of the implement frame increases lateral clearance for the implement. As will be appreciated, the increased lateral clearance to either side of the implement frame may be used to operate the tractor in a limited clearance application with minimal disturbance to low lying limbs (i.e., orchard), while maintaining protection for the operator at the operator station. Moreover, the ability to rotate or pivot the roll bar assembly from one position to another about a vertical axis, without having to remove or disassemble parts, eases the burden on the operator by facilitating movement about a pivot which absorbs the majority of the weight of the roll bar assembly.

Turning now to FIG. 3, when the roll bar assembly 22 is positioned to either side of the implement frame 12 such that the cross-piece 34 extends fore-and-aft and generally parallel to the implement frame, the roll bar assembly 22 may be folded downwardly so as to adjust the lateral position of the cross-piece relative to the operator station. The horizontal axis 54 defined by locking mechanism 46 allows the upright support members 30, 32 of the roll bar assembly to be tilted from a substantially vertical position relative to the implement frame to a less than vertical position relative to the implement frame.

Returning to FIG. 2, when a U-shaped roll bar assembly is moved into a position such that the cross-piece 34 extends in a fore-and-aft direction and generally parallel to the implement frame, one attachment assembly of each pair of attachment assemblies 38, 40 and 38', 40' anchors a respective support member of the roll bar assembly to the implement frame. After rotating the roll bar assembly, about a generally vertical axis and into a desired relationship relative to the frame, the locking mechanism 46 conditions the roll bar assembly against rotation relative to the frame. Similarly, locking mechanism 60 locks the upright support member of the roll bar assembly against angling movement relative to the frame after the lateral position of the cross-piece 34 relative to the operator station has been adjusted.

Providing each locking mechanism 60 with a detent mechanism 70 facilitates angling movement of the roll bar assembly relative to the frame. As will be appreciated, the detent mechanism 70 allows the locking pin 64 to be secured in a releasably locked position while facilitating angular adjustment of the roll bar assembly. After the angular position of the roll bar assembly has been effected, the latching pin 76 of the detent mechanism may be readily released from the detent thereby urging the locking pin 64 into a locking engagement with a respective adjustment member.

As in the first embodiment, the T-shaped roll bar assembly of the second embodiment illustrated in FIGS. 8, 9 and 10 is movable about a generally vertical axis and about a generally horizontal axis. The ability to rotate the cross-piece 134 about a generally vertical axis from a position whereat it extends laterally across the implement frame (solid lines in FIG. 9) to a position whereat it extends fore-and-aft and generally parallel to the implement frame minimizes interference characteristics of the roll bar assembly with low lying tree limbs. Moreover, the ability to angularly tilt the roll bar assembly into the phantom line positions illustrated in FIGS. 8 and 10 allows the implement to operate in areas having limited vertical clearance.

From the foregoing, it will be observed that numerous modifications and variations can be effected without departing from the true spirit and scope of the novel concept of the present invention. It will be appreciated that the present disclosure is intended to set forth exemplifications of the invention which are not intended to limit the invention to the specific embodiments illustrated. The disclosure is intended to cover by the appended claims all such modifications as fall within the scope of the claims.

What is claimed is:

1. An adjustable roll over protection apparatus for an implement having a frame and an operator station, said protection apparatus comprising:
   a roll bar assembly having a generally horizontal cross-piece normally supported above said operator station by at least one upright support member; and
   means for adjustably mounting said roll bar assembly to the frame of the implement, said adjustable mounting means defining a generally vertical axis which is substantially colinear with said upright support member and about which the roll bar assembly pivotably moves relative to the implement frame.

2. The adjustable roll over protection apparatus according to claim 1 wherein said adjustable mounting means includes an attachment assembly secured to said implement frame and defines said generally vertical axis about which said roll bar assembly pivotably moves, said attachment assembly securing a lower section of said upright support member for pivotal movement relative to said implement frame.

3. The adjustable roll over protection apparatus according to claim 2 wherein said attachment assembly includes an upright pivot extending within a lower portion of said upright support member and about which the roll bar assembly moves relative to the implement frame.

4. The adjustable roll over protection apparatus according to claim 1 wherein said roll bar assembly has a generally T-shaped configuration.

5. The adjustable roll over protection apparatus according to claim 1 wherein said roll bar assembly has a generally inverted U-shaped configuration.

6. The adjustable roll over protection apparatus according to claim 1 wherein said adjustable mounting means interconnecting said roll bar assembly and implement frame further defines a generally horizontal axis about which the roll bar assembly is movable relative to the implement frame.

7. The adjustable roll over protection apparatus according to claim 1 further including releasable locking means for inhibiting movement of said roll bar assembly relative to said implement frame.

8. An adjustable roll over protection apparatus for an implement having a fore-and-aft extending frame and an operator station, said protection apparatus comprising:
   a roll bar assembly having a generally horizontal cross-piece normally supported above said operator station by a pair of spaced and generally upright support legs; and
   means for adjustably mounting said roll bar assembly to said implement frame for pivotable displacement relative thereto, said adjustable mounting means including a pair of spaced attachment assemblies, with each attachment assembly serving to releasably anchor a respective support leg of said roll bar assembly to the implement frame and allowing for movement of the respective support leg about a generally vertical axis such that the cross-piece of the roll bar assembly is movable between a first position whereat it extends laterally across the implement frame and a second position whereat the cross-piece of the roll bar assembly extends fore-and-aft and generally parallel to the implement frame.

9. The adjustable roll over protection apparatus according to claim 8 wherein said adjustable mounting means further includes means for allowing said roll bar assembly to be angularly tilted relative to the implement frame and about a generally horizontal axis from a substantially vertical position to a less than vertical position.

10. The adjustable roll over protection assembly according to claim 8 further including releasable locking means for locking said roll bar assembly in different adjustable positions relative to the implement frame, said locking means including an endwise movable locking pin carried by at least one of said upright support members and which cooperates with the respective attachment assembly in locking said roll bar assembly in different adjustable positions.

11. The adjustable roll over protection apparatus according to claim 8 wherein each attachment assembly includes an upright pivot which defines said generally vertical axis and which is accommodated within a lower portion of a respective upright support leg of said roll bar assembly.

12. The adjustable roll over protection apparatus according to claim 8 wherein said roll bar assembly is a tubular structure and wherein the cross-piece connects upper ends of said upright support legs to each other.

13. The adjustable roll over protection apparatus according to claim 8 wherein said roll bar assembly is a tubular structure having a generally U-shaped configuration.

14. The adjustable roll over protection apparatus according to claim 8 further including a second pair of spaced attachment assemblies arranged in a fore-and-aft relationship relative to the other pair of attachment assemblies, wherein one attachment assembly of each pair of attachment assemblies anchors a respective support leg of said roll bar assembly to the implement frame when the cross-piece of said roll bar assembly extends generally parallel to the implement frame.

15. An adjustable roll over protection apparatus for an implement having a fore-and-aft extending frame and an operator station, said protection apparatus comprising:
   a roll bar assembly having a generally horizontal cross-piece normally supported above said operator station a predetermined distance by at least one generally vertical support member; and
   means for adjustably mounting said roll bar assembly to the implement frame, said adjustable mounting means including an attachment assembly secured to said implement frame to secure a lower section of said vertical support member for pivotal movement relative to said implement frame, said adjustable mounting means further including means defining a generally horizontal axis about which the support member angularly moves to allow the roll bar assembly to be adjustably and angularly positioned relative to the frame while maintaining the cross-piece in a generally fore-and-aft orientation extending generally parallel to the frame.

16. The adjustable roll over protection apparatus according to claim 15 wherein said adjustable mounting means further defines a generally vertical axis about which said vertical support member rotates to allow the cross-piece of said roll bar assembly to extend laterally across the implement frame.

17. The adjustable roll over protection apparatus according to claim 15 further including releasable locking means for id roll bar assembly in different angular positions relative to the implement frame, said locking means including a resiliently biased and endwise movable locking pin carried by said generally vertical support member, said locking pin cooperating with said attachment assembly in locking said roll bar assembly in different angular positions relative to said implement frame.

18. The adjustable roll over protection apparatus according to claim 17 wherein said locking means includes detent means for releasably holding said locking pin in a released position.

19. An adjustable roll over protection apparatus comprising:
a roll bar assembly having a cross-piece and at least one support member connected to and extending from said cross-piece; and
adjustable mounting means arranged toward a lower end of said support member, said adjustable mounting means defining a generally vertical axis which is substantially colinear with said upright member and about which said roll bar assembly is adapted to move.

20. The adjustable roll over protection apparatus according to claim 19 wherein said roll bar assembly is a tubular structure having a generally U-shaped configuration.

21. The adjustable roll over protection apparatus according to claim 19 further including locking means for releasably locking said roll bar assembly to said adjustable mounting means and defining a generally horizontal axis about which said roll bar assembly angularly moves to allow tilting of said roll bar assembly relative to a generally vertical reference plane.

22. The adjustable roll over protection apparatus according to claim 21 further including locking means for releasably securing said support member of said roll bar assembly to adjustable mounting means in any of a plurality of angularly tilted positions.

23. The adjustable roll over protection apparatus according to claim 15 wherein said roll bar assembly is a tubular structure having a generally T-shaped configuration.

* * * * *